United States Patent
Liu et al.

(10) Patent No.: US 9,509,909 B2
(45) Date of Patent: Nov. 29, 2016

(54) METHOD AND APPARATUS FOR A SURROUND VIEW CAMERA SYSTEM PHOTOMETRIC ALIGNMENT

(71) Applicant: Texas Instruments Incorporated, Dallas, TX (US)

(72) Inventors: Yucheng Liu, West Lafayette, IN (US); Buyue Zhang, Plano, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/546,929

(22) Filed: Nov. 18, 2014

(65) Prior Publication Data
US 2015/0138312 A1   May 21, 2015

Related U.S. Application Data

(60) Provisional application No. 61/905,617, filed on Nov. 18, 2013, provisional application No. 61/984,906, filed on Apr. 28, 2014.

(51) Int. Cl.
| | | |
|---|---|---|
| *H04N 5/232* | (2006.01) | |
| *G06T 3/40* | (2006.01) | |
| *H04N 9/04* | (2006.01) | |
| *H04N 9/68* | (2006.01) | |

(52) U.S. Cl.
CPC ......... *H04N 5/23238* (2013.01); *G06T 3/4038* (2013.01); *H04N 9/045* (2013.01); *H04N 9/68* (2013.01)

(58) Field of Classification Search
None
See application file for complete search history.

(56) References Cited

U.S. PATENT DOCUMENTS

| | | | | |
|---|---|---|---|---|
| 8,818,101 B1* | 8/2014 | Lim | ............. | G06T 3/4038 345/629 |
| 2012/0249725 A1* | 10/2012 | Corcoran | ............. | G06T 3/0062 348/36 |
| 2013/0088578 A1* | 4/2013 | Umezawa | ............. | G06T 7/0075 348/47 |
| 2013/0271593 A1* | 10/2013 | Tsujimoto | ............. | G09G 5/02 348/79 |
| 2013/0321671 A1* | 12/2013 | Cote | ............. | H04N 5/365 348/241 |
| 2013/0321674 A1* | 12/2013 | Cote | ............. | H04N 9/64 348/242 |
| 2013/0321677 A1* | 12/2013 | Cote | ............. | H04N 5/217 348/243 |
| 2013/0322746 A1* | 12/2013 | Cote | ............. | G06T 1/20 382/163 |
| 2013/0322753 A1* | 12/2013 | Lim | ............. | G06T 5/001 382/167 |
| 2014/0327774 A1* | 11/2014 | Lu | ............. | G06K 9/00791 348/148 |
| 2014/0362173 A1* | 12/2014 | Doepke | ............. | H04N 5/23238 348/36 |

* cited by examiner

*Primary Examiner* — Jingge Wu
(74) *Attorney, Agent, or Firm* — Gregory J. Albin; Frank D. Cimino

(57) ABSTRACT

A method, apparatus and a surround view camera system. The method includes extracting block samples from at least one of a composite view geometric LUT, input fish-eye image and view overlapping region, selecting sample inliers from the extracted block samples, estimating optimal color gain for the selected block samples, performing refined adjustment based on the estimated color gain and applying color transform, and producing a composite surround view image.

6 Claims, 11 Drawing Sheets

METHOD AND APPARATUS FOR A SURROUND VIEW CAMERA SYSTEM PHOTOMETRIC ALIGNMENT

CROSS REFERENCES TO RELATED APPLICATIONS

This application claims priority from U.S. Provisional Patent Application No. 61/905,617 filed on Nov. 18, 2013, and U.S. Provisional Patent Application No. 61/984,906 filed on Apr. 28, 2014, both of which are hereby incorporated by reference in their entirety.

BACKGROUND OF THE INVENTION

Field of the Invention

Embodiments of the present invention generally relate to a method and apparatus for surround view camera system photometric alignment.

Description of the Related Art

Surround View camera system is an emerging Advanced Driver Assistance Systems (ADAS) that help driver park and drive safer. A classic surround view camera system synthesizes a 360 degree bird-eye view image from four or more cameras mounted around the car. The composite image usually suffers from inconsistent and unnatural brightness and color transition across the views due to different exposure and AWB of cameras facing different directions.

Therefore, there is a need for a method and/or apparatus for correcting the photometric misalignment in effects, such as brightness and color mismatch, across the views globally and locally.

SUMMARY OF THE INVENTION

Embodiments of the present invention relate to a method, apparatus and a surround view camera system. The method includes extracting block samples from at least one of a composite view geometric LUT, input fish-eye image and view overlapping region, selecting sample inliers from the extracted block samples, estimating optimal color gain for the selected block samples, performing refined adjustment based on the estimated color gain and applying color transform, and producing a composite surround view image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
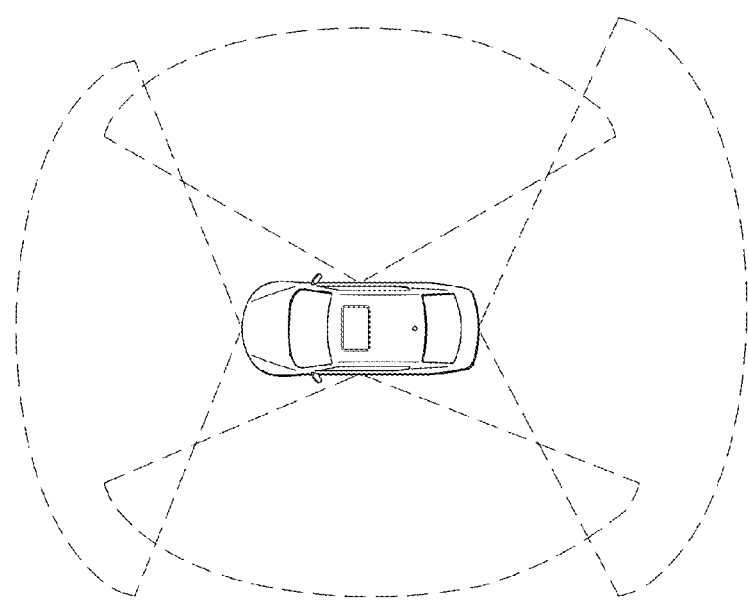
FIG. 1 is an embodiment of a surround view camera system.
Figure 2:
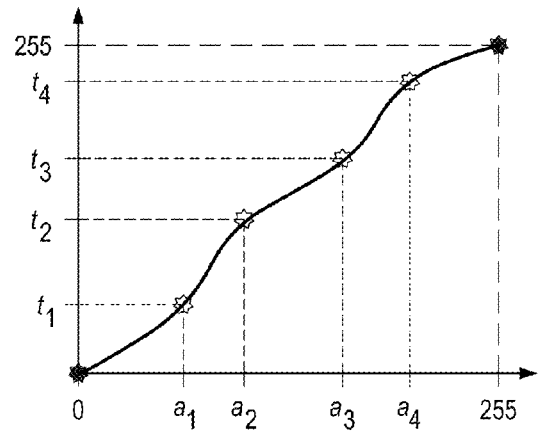
FIG. 2 is an embodiment of a tone mapping curve.
Figure 3:
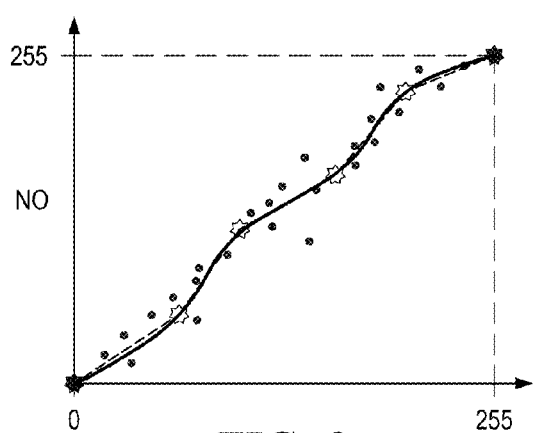
FIG. 3 is an embodiment of a piecewise linear approximated tone mapping function.
Figure 4:
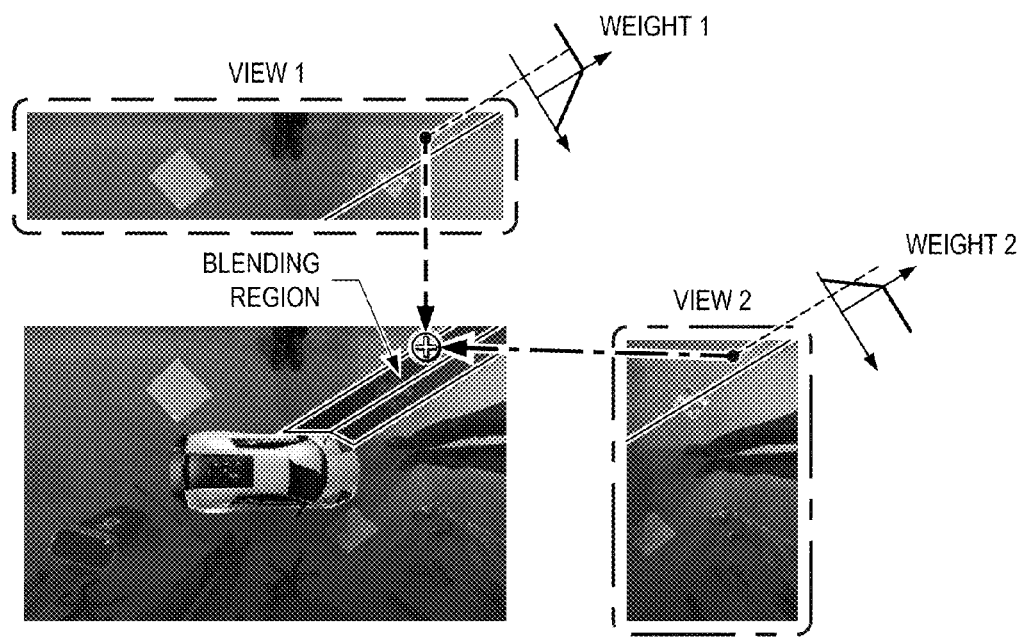
FIG. 4 is an embodiment of a linear blending.
Figure 5:
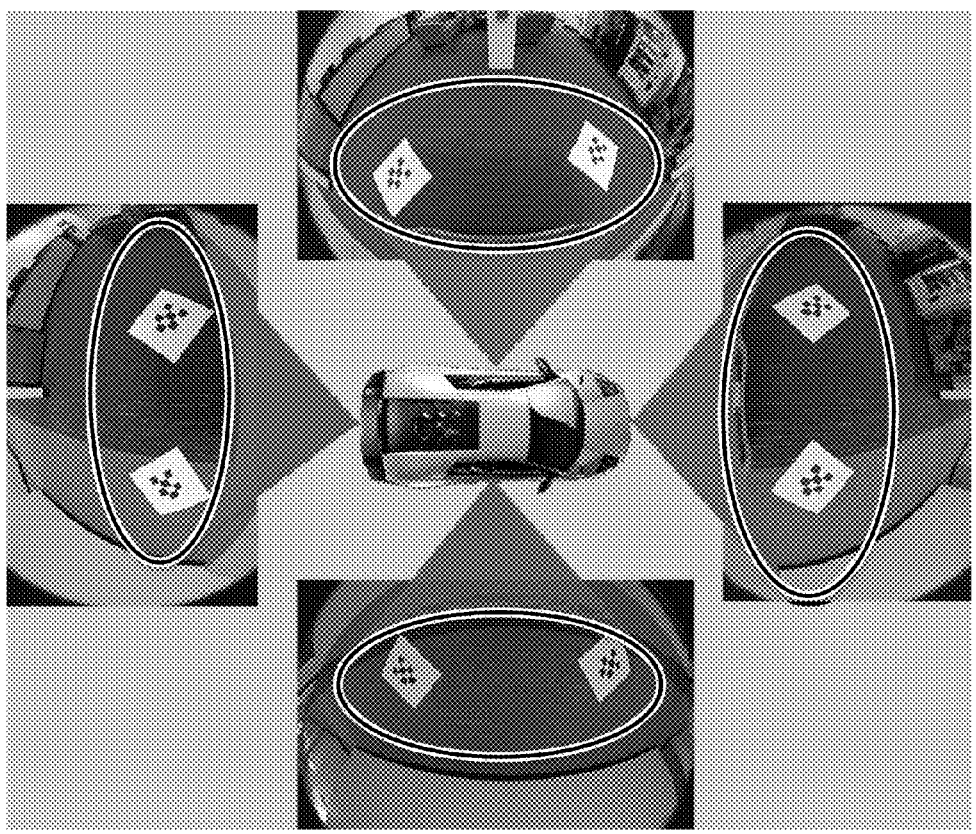
FIG. 5 is an embodiment of an input fish eye images.
Figure 6:
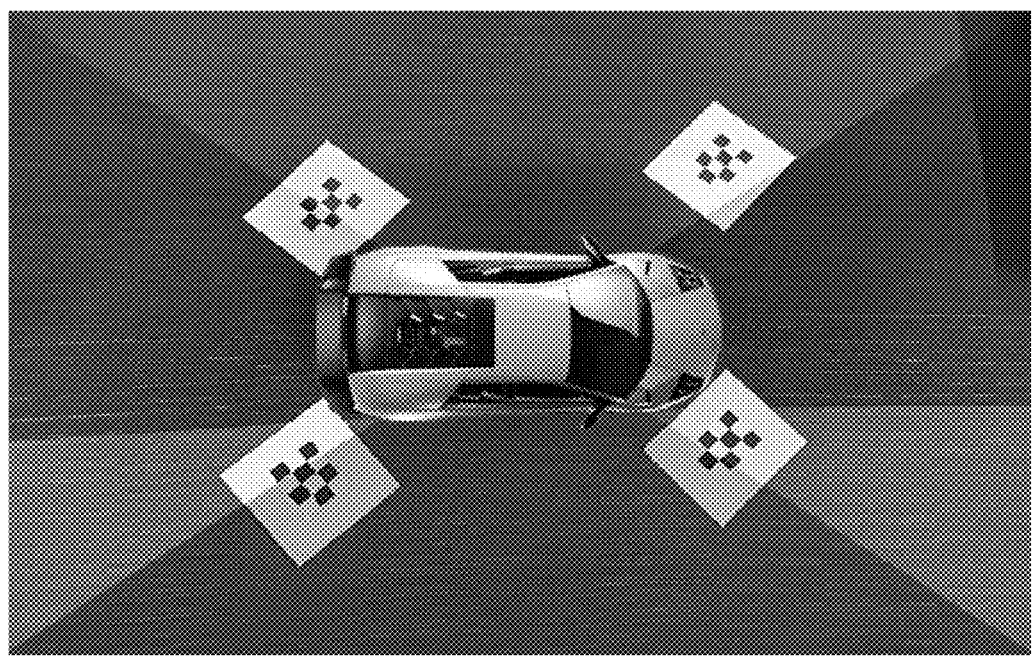
FIG. 6 is an embodiment of a stitched image without photometric correction.
Figure 8:
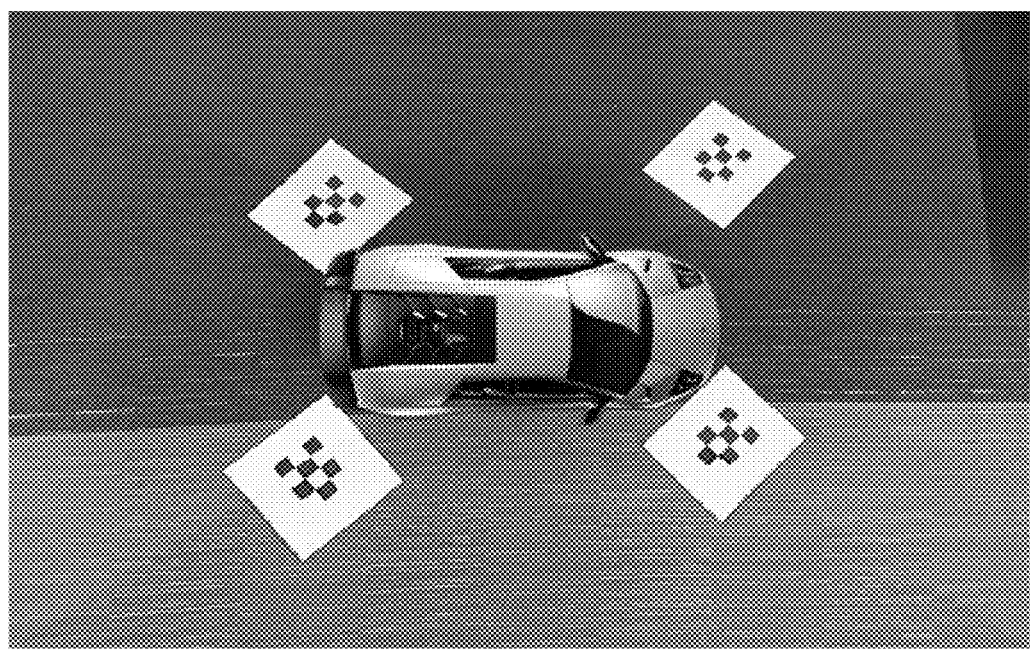
FIG. 8 is an embodiment of a stitched image with gain correction.
Figure 7:
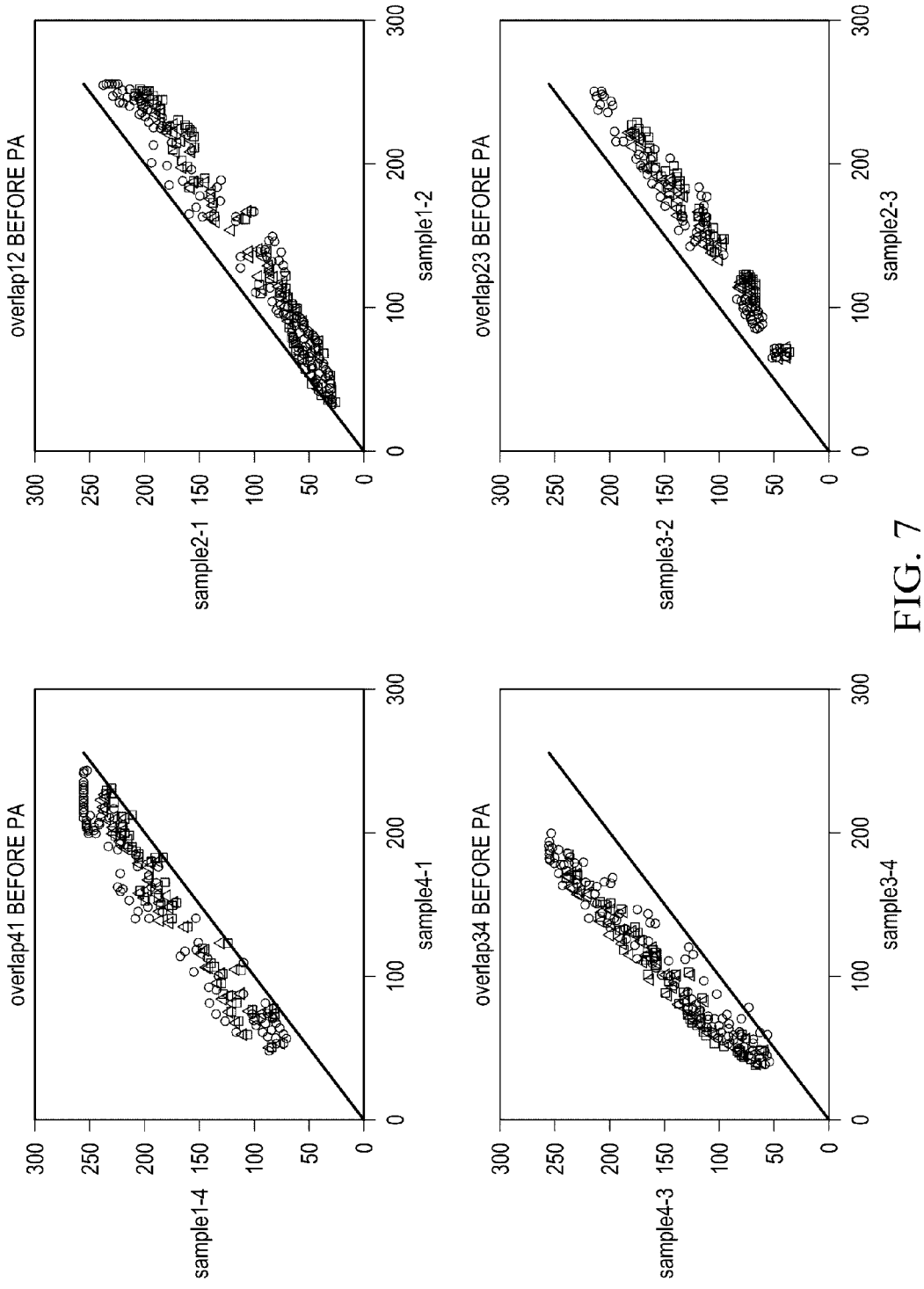
FIG. 7 is an embodiment of a sample relationship in the overlapping region without photometric alignment.
Figure 9:
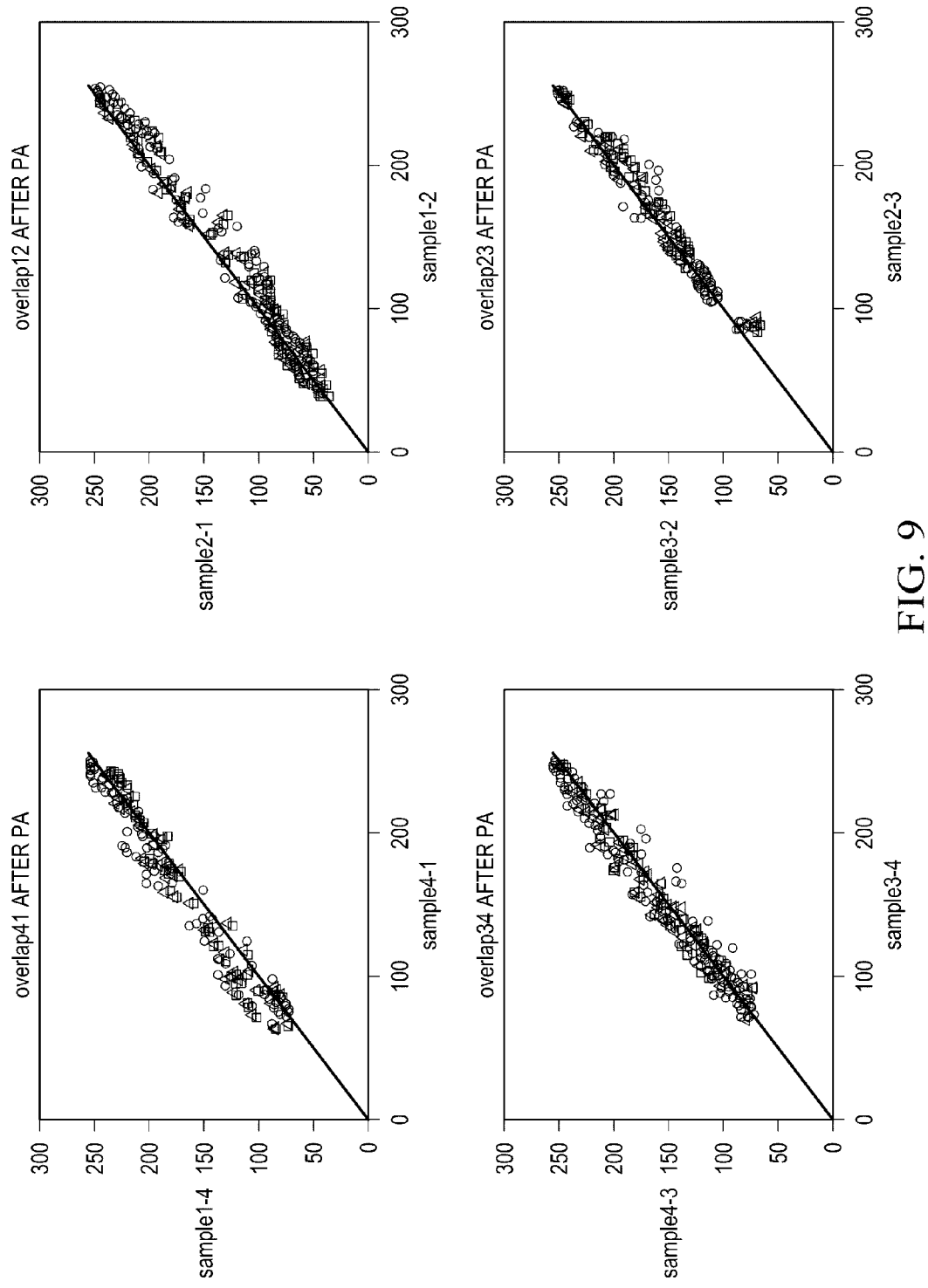
FIG. 9 is an embodiment of a data relationship in the overlapping region after gain correction.
Figure 10:
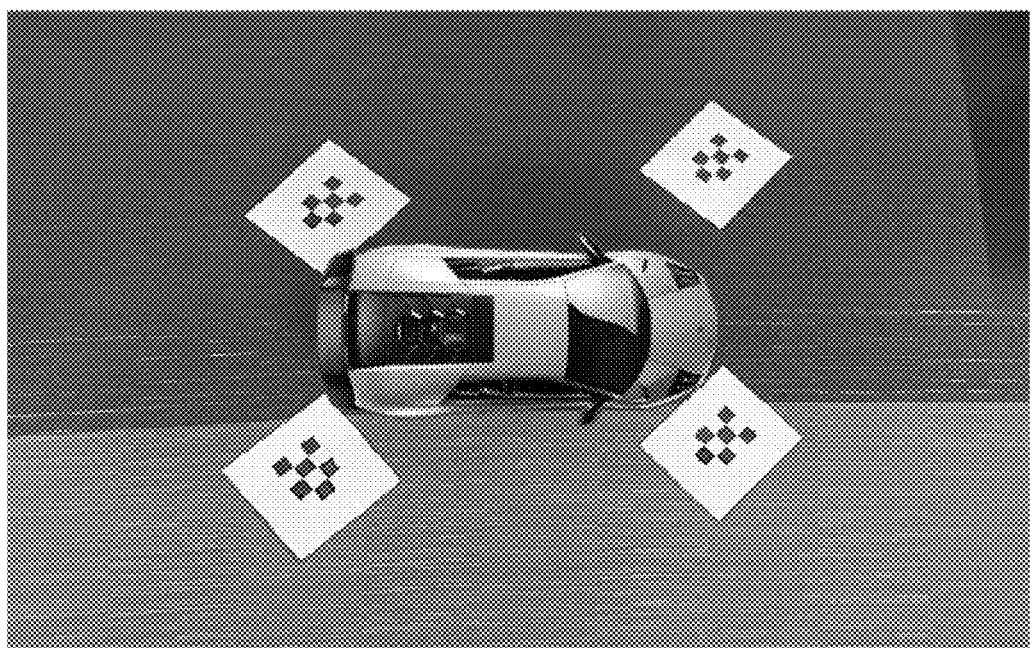
FIG. 10 is an embodiment of a stitched image with tone curve correction.
Figure 12:
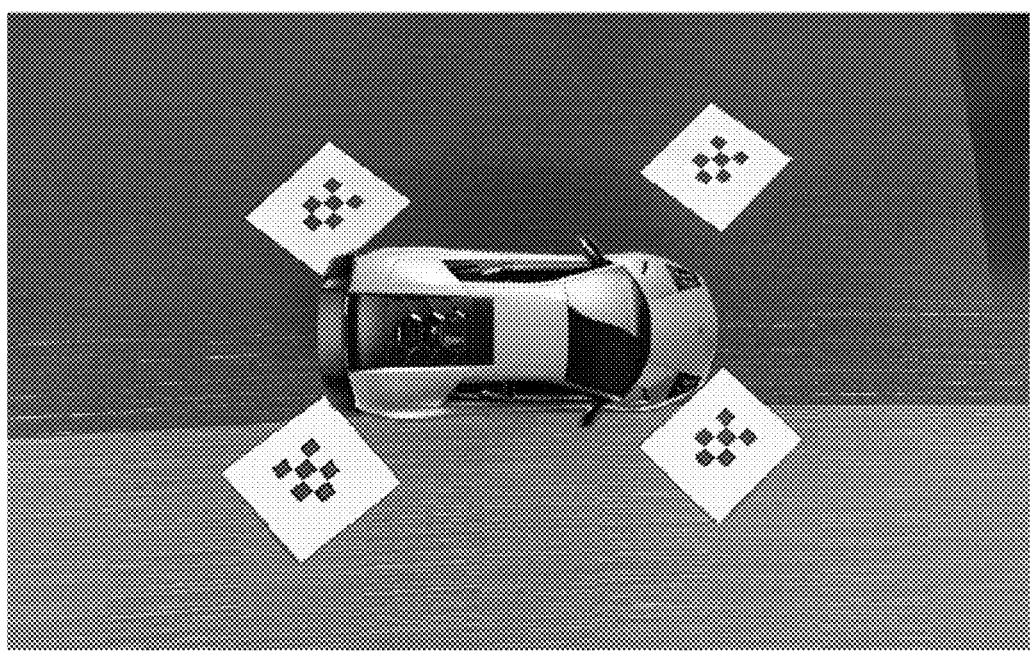
FIG. 12 is an embodiment of a blended image.
Figure 11:
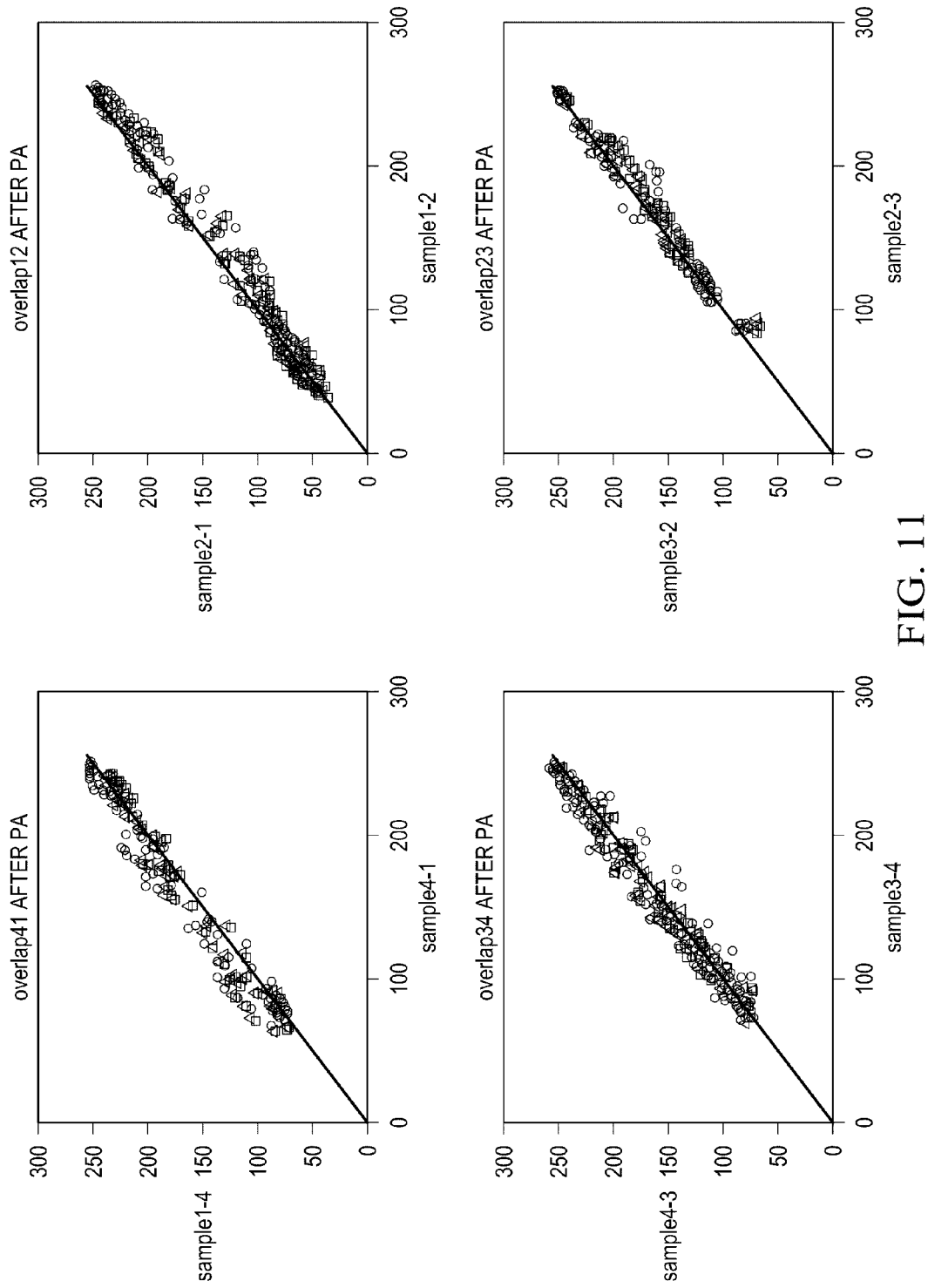
FIG. 11 is an embodiment of a data relationship in the overlapping region after tone curve correction.

To correct a photometric misalignment across the views globally and locally, the method and apparatus described herein apply a color adjustment and gain correction. In one embodiment, the method and apparatus also apply tone curve refinement. The color adjustment algorithm globally aligns the brightness and color of each individual view to reduce the visibility of seam in the composite view. To eliminate the visibility of seams, local blending is applied where adjacent views are stitched.

For blending, there are three options: (1) one is a basic linear blending scheme, (2) selective blending, and (3) multi-band blending. The suitable option is used based on the computation complexity requirement and quality requirement.

Usually, the input to our photometric alignment algorithm are: the fish-eye images directly from the cameras, the geometric look-up table (LUT) generated from the calibration module of the surround view camera system, and the coordinate information specifying the view overlapping region in the composite images. The geometric LUT contains the pixel indices from the composite image to the input fisheye images. A step by step description of the algorithm is as follows.

The adjacent cameras usually expect to see the same ground object at the same location of their overlapping region. However, due to the imperfect fish-eye lens correction, light reflection on the objects, and the disparity between two views for 3D objects, there is pixel level object misalignments in the overlapping area of two adjacent views. Therefore, block average values are used, rather than pixel values, in the view overlapping regions as samples to avoid the misleading color relationship due to pixel level object misalignments.

Sample pairs are found $(C_i^{mn}, C_i^{nm})$, $i=1, 2, 3, \ldots, N_{mn}$, $(m, n) \in P$ from the corresponding block pairs in the view overlapping region via block averaging. Note that $C_i^{mn} = (R_i^{mn}, G_i^{mn}, B_i^{mn})$ is the ith sample from view m, while $C_i^{nm} = (R_i^{nm}, G_i^{nm}, B_i^{nm})$ is the ith sample from view n in the overlapping region of view m and n. $C_i^{mn}$ and $C_i^{nm}$ correspond to the block statistics at the same position in the overlapping region of view m and n. $N_{mn}$ is the number of blocks in the overlapping area of view m and n, and P is the set of all adjacent view pairs. Note here that pixel values are indexed by the geometric LUT from the composite image to the input fish-eye images.

If the objects captured by two adjacent cameras in their shared area aren't co-planer with the ground, they will be projected in different directions in the scenes of the two cameras. Since sample mismatch due to such object misalignment don't reflect the brightness and color mismatch of the views, they are rejected as outliers and a fixed threshold is used to reject the outlier sample pairs $$\Omega_{mn} = \{i | (R_i^{mn} - R_i^{nm})^2 + (G_i^{mn} - G_i^{nm})^2 + (B_i^{mn} - B_i^{nm})^2 < T\}, i = 1, 2, \ldots, N_{mn} \quad (1)$$

where, $\Omega_{mn}$ is the set of inlier samples for the overlapping region between view m and n, and $N_{mn}$ is the total number of blocks.

The first global correction algorithm is based on a gain model, i.e. a multiplicative gain is applied to each color channel of each view to correct the brightness and color mismatch of the composite view. The correction function is $$f_{gain}(x) = g \cdot x \quad (2)$$

Note that gains are only dependent on the view and color channel, they don't change from pixel to pixel within one view of the camera.

The optimal gains are estimated for R, G, B channels independently. To simplify the notation, we simply use I for one of the color intensities of the three color channels. Assuming M is the number of cameras in the surround view system, the cost function to minimize for optimal gains is:

$$\min_{(g_1, g_2, \ldots, g_M)} \sum_{(m,n) \in P} \sum_{i \in \Omega_{mn}} (g_m I_i^{mn} - g_n I_i^{nm})^2 \quad (3)$$

subject to $$g_m \geq 1, m = 1, 2, \ldots, M$$

The inequality constraints serve two purposes: (1) Regularize the cost function, prevent the trivial solution $g_m = 0$, m=1, 2, . . . , M to happen; and (2) Avoid color artifacts at saturated region of the image.

Since this is a convex quadratic programming problem with inequality constraints, KKT optimization may be applied to find the optimal gain. There are two methods to optimize this cost function: (1) KKT-like method, which is based on the fact that the minimum gain vector must fall into the feasible set or on the boundary of the feasible set. Thus, combinations of active inequality constraints are determined and the optimal solution is found using Lagrange multiplier method, for example, and the minimum cost is selected. This method essentially agrees with what KKT conditions suggest. (2) Simplified method, which is an iterative algorithm used to find the optimal gains that minimize the cost. Let $G=(g_1, g_2, \ldots, g_M)$ be the gain vector to be optimized. Each element in the vector is sequentially updated by solving for unconstrained optimal value for that element with all other elements fixed. If the optimal value is less than one, it is set to one and the iteration continues. The iteration stops when the element change from the last iteration is below some threshold.

The algorithm description of the optimization is as follows:

```
Initialize prevG and newG
While |newG − prevG| > T
    prevG = newG
    for m = 1: M
```
$$g_m^* = \frac{g_n B_{mn} + g_l B_{ml}}{A_{mn} + A_{ml}}$$
```
        if g_m* < 1
            g_m ← 1
        else
            g_m ← g_m*
        end
    end
    newG = (g_1, g_2, . . . , g_M)
end
```

Since the sub problem to find optimal $g_m^*$ while other $g_n$ are fixed is a quadratic optimization problem with respect to $g_m$, it has a closed-form solution that can be written as:

$$g_m^* = \frac{g_n B_{mn} + g_l B_{ml}}{A_{mn} + A_{ml}} \quad (4)$$

where n and l are the two overlapping views with view m, and $$B_{mn} = \sum_{i \in \Omega_{mn}} I_i^{mn} I_i^{nm}$$

$$A_{mn} = \sum_{i \in \Omega_{mn}} (I_i^{mn})^2$$

The complete iteration process is just based on sample statistics $B_{mn}$ and $A_{mn}$, thus the computation is very efficient. The gain vector usually converges within 20 iterations.

Since the gains are all greater or equal to one, we need to compress the gain at high intensity region to avoid clipping artifacts after the correction. Practically, the gain correction function $f_{gain}(x)$ for gain g is generated by interpolating 4 points at $$(0, 0), \left(\frac{112}{g}, 112\right), \left(\frac{225}{g}, 225\right), (255, 255).$$

There is still some residue error after the gain correction, which can be further corrected with optimal tone mapping curve. The tone mapping curve is a color mapping curve representing the relationship between input (X axis) and output (Y axis) within the range of 0 and 255 for 8-bit image. It is by definition a general form of transformation for the color correction model.

Theoretically, one may specify as many points on the tone curve as one desires to define the shape of the curve. In practice, there are some constraints put on the tone mapping curve to free the correction result from color artifacts. For example, the tone curve should be smooth and monotonous. Typically a few points would be enough to specify a tone curve, and the rest of the curve can be easily obtained by smooth Hermite polynomial interpolation. Therefore, designing an optimal tone mapping curve for each view is desirable to reach a tone mapping function that minimizes the discrepancy between the sample pairs extracted.

Utilizing the gain correction function from the gain correction algorithm, the samples are updated with the gain correction function.

$$J_i^{mn} = f_{gain}^m(I_i^{mn}) \quad (5)$$

$J_i^{mn}$ is the gain corrected intensity value for the ith sample from view m in the overlapping region between view m and n.

After the gain correction, adjacent view pairs should expect to have a more similar overlapping region in the part with correct object correspondence. To obtain a more robust tone curve estimation we reselect the inlier samples based on the updated values from gain correction.

$$\overline{\Omega}_{mn} = \left\{ i \left| \begin{array}{l} (f_{R\_gain}^m(R_i^{mn}) - f_{R\_gain}^n(R_i^{nm}))^2 + \\ (f_{G\_gain}^m(G_i^{mn}) - f_{G\_gain}^n(G_i^{nm}))^2 + \\ (f_{B\_gain}^m(B_i^{mn}) - f_{B\_gain}^n(B_i^{nm}))^2 < T \end{array} \right. \right\} \quad (6)$$

The optimal tone curve will be estimated as second-stage transformation that gives a refined correction to the gain corrected result. The parameters to define tone curve are the number of anchor points p, and the anchor point coordinates $(a_i, t_i)$, $i=1, 2, \ldots, p$. The rest of the curve can be generated via these parameters by Hermite Interpolation. The cost function for optimal tone curve is given as $$F = \sum_{(m,n) \in P} \sum_{i \in \overline{\Omega}_{mn}} [f_{tone}^m(J_i^{mn}) - f_{tone}^n(J_i^{nm})]^2 + \quad (7)$$

$$\beta \sum_m \sum_{n \in \partial m} \sum_{i \in \overline{\Omega}_{mn}} [f_{tone}^m(J_i^{mn}) - J_i^{mn}]^2$$

where ∂m is the set of views that have overlap with view m, and β is the regularization factor. $f_{tone}^m$ is the general tone mapping function for view m.

The first term in the cost function represents the blockwise difference in all overlapping regions, and the second term represents the discrepancy between the refined transformed result and the gain corrected result. Unlike the last cost function, this is an unconstrained optimization problem, but the non-linearity in $f$ makes the optimization difficult.

To reduce the dimension of the optimization problem, the input coordinates are specified of the anchor points such that they evenly divide the range of sample data. Let $(a_i^m, t_i^m)$ be the ith anchor points of the tone mapping function for view m.
Setting $$a_i^m = S_m + \frac{(i-1)(T_m - S_m)}{p-1} \quad (8)$$

where p is the number of anchor points and $$S_m = \max\{25, \min\{J_i^{mn} | i \in \Omega_{mn}, n \in \partial m\}\}$$

$$T_m = \min\{225, \max\{J_i^{mn} | i \in \Omega_{mn}, n \in \partial m\}\}$$

The number of anchor points p is flexible (3~7) and can be defined by user.

Thus, the only parameters left to be optimized are $t_i^m$, $i=1, 2, \ldots, p$, $m=1, 2, \ldots M$. The tone mapping function is approximated with a piecewise linear function connecting all anchor points and with fixed end points at (0,0) and (255,255).

The idea for optimization is to iteratively and sequentially update each anchor point while keep the other anchor points unchanged. According to the piecewise linear assumption, the optimization for the kth anchor points of view m only involves the sample data falling into the value range on both sides of this anchor point. The sample subset is defined as:

$$D_k^{mn} = \{i \in \Omega_{mn} | a_k^m \le J_i^{mn} < a_{k+1}^m\} \quad (9)$$

This set includes the inlier samples in the overlapping region of view m and n that falls between the kth and the (k+1)th anchor points of the tone mapping curve for view m. With the other anchor points fixed, the cost function involving $t_k^m$ is a quadratic and, thus, can be minimized analytically. The updating formula for $t_k^m$ is $$t_k^{m*} = \frac{-b(aB + cD) - ab - cd}{(1+b)(aa+cc)} \quad (10)$$

where $$aB = \sum_{n \in \partial m} \sum_{i \in D_k^{mn}} \frac{J_i^{mn} - a_{k-1}^m}{a_k^m - a_{k-1}^m} \left( \frac{t_{k-1}^m(a_k^m - J_i^{mn})}{a_k^m - a_{k-1}^m} - f_{tone}^n(J_i^{nm}) \right)$$

$$ab = \sum_{n \in \partial m} \sum_{i \in D_k^{mn}} \frac{J_i^{mn} - a_{k-1}^m}{a_k^m - a_{k-1}^m} \left( \frac{t_{k-1}^m(a_k^m - J_i^{mn})}{a_k^m - a_{k-1}^m} - J_i^{nm} \right)$$

$$cD = \sum_{n \in \partial m} \sum_{i \in D_k^{mn}} \frac{a_{k+1}^m - J_i^{mn}}{a_{k+1}^m - a_k^m} \left( \frac{t_{k+1}^m(J_i^{mn} - a_k^m)}{a_{k+1}^m - a_k^m} - f_{tone}^n(J_i^{nm}) \right)$$

$$cd = \sum_{n \in \partial m} \sum_{i \in D_k^{mn}} \frac{a_{k+1}^m - J_i^{mn}}{a_{k+1}^m - a_k^m} \left( \frac{t_{k+1}^m(J_i^{mn} - a_k^m)}{a_{k+1}^m - a_k^m} - J_i^{nm} \right)$$

The optimization algorithm can be described as

```
For m = 1: M
    S_m = max{25,min{J_i^{mn}|i ∈ Ω_{mn},n ∈ ∂m}}
    T_m = min{225,max{J_i^{mn}|i ∈ Ω_{mn},n ∈ ∂m}}
    For k = 1: p
```

$$a_k^m = S_m + \frac{(i-1)(T_m - S_m)}{p-1}$$

```
    end
end
Initialize prevf and newf
While |prevf - newf|> T
    prevf = newf
    For m = 1:M
        For k = 1: p
```

$$t_k^{m*} = \frac{-b(aB + cD) - ab - cd}{(1+b)(aa+cc)}$$

```
            Set t_k^m = t_k^{m*}
        end
        Update f_{tone}^m by interpolating
        {(a_k^m, t_k^m)|k = 1,2, . . . , p}∪{(255,255)}∪{(0,0)}
    end
    newf = {f_{tone}^m| m = 1,2, . . . M}
```

After getting the optimal $f_{tone}^m(x)$ for each view, we can obtain the final transformation function as $$f_{final}^m(x) = f_{tone}^m(f_{gain}^m(x)) \quad (11)$$

The photometric alignment corrects the global color of each view in such a way that when they are stitched together, the global color of the stitched image looks consistent across the whole composite view. However, in one embodiment, the global method cannot fully correct the local color misalignment at the seams where different views are stitched. Therefore, further local operation is needed to fully correct the local misalignment at the seams. However, this step is optional if the computation complexity is more of a concern than visual quality.

This is the simplest view stitching strategy with lowest computation complexity. Stitching seams are specified in each view's overlapping region in the composite image. In the synthesis process, pixels are chosen from one view on one side of the seam and from the other view on the other side. This method may not correct the local color misalignment at the seams. In addition, pixels may be selected based on simple distortion estimation. For example, at the seam, we select pixel from the view which has less fisheye distortion at the pixel location.

This method applies a blending operation near the seams to get rid of the visible boundary due to view differences. Specifically, for the blending region near the seam, the pixel weight for one view fades linearly as the distance to the seam grows on the other side. The pixel values inside the blending region of the synthesized image are computed as the weighted average of the pixel values from two views.

Since the weights drop to zero gradually, a smooth transition is observed from one view to another instead of a sharp color change. The problem with linear blending is that objects inside the blending region are usually blurred due to imperfect object alignment between two different views. For non-planer objects, ghosting artifacts may be observed inside the blending area because of the blending of mismatch objects.

Selective blending is an improvement over the linear blending method. It combines the advantages of direct stitching and linear blending in such a way to reduce the blurry/ghosting artifacts in linear blending and also improve the seam in direct stitching.

For the pixels in the blending region, both linear blending and direct stitching are applied to find the synthesized pixel value $I_{linear}$ and $I_{stitch}$. Then, the two results are combined with a weight related to the difference between two views at this pixel. The lower the difference, the higher linear blending is weighted, and vise versa.

This idea of selective blending is to avoid blending pixels corresponding to mismatched objects, and therefore reduce the blurry and ghosting effects. However, in one embodiment, it fails when the mismatched objects have similar colors or the residual view discrepancy after photometric alignment is still too big.

In some cases, the color is not a robust feature to identify mismatched objects. Multi-band blending improves the rendering in the blending region by adaptively blending the sub-band components of the views. Before blending the pixels from two overlapping view, we first apply a frequency sub-band decomposition to the overlapping region from both views. For high frequency band a smaller blending region may be applied; while for low frequency band, a larger blending region may be used. As a result, this operation averages over longer spatial range for low frequency components and over shorter spatial range for high frequency components. Since high frequency components may be better preserved with a smaller blending range, a sharper rendering of the details in the blending region may be observed. However, multi-band blending doesn't address the ghosting problem for the non-planer object misalignment.

In one embodiment, both the input and the output are 8-bit RGB data. Both RGB and YUV data format may utilize the described method and apparatus. Since YUV is the much more prevalent in video use-case, it is desirable to handle such data format.

Figure 13:
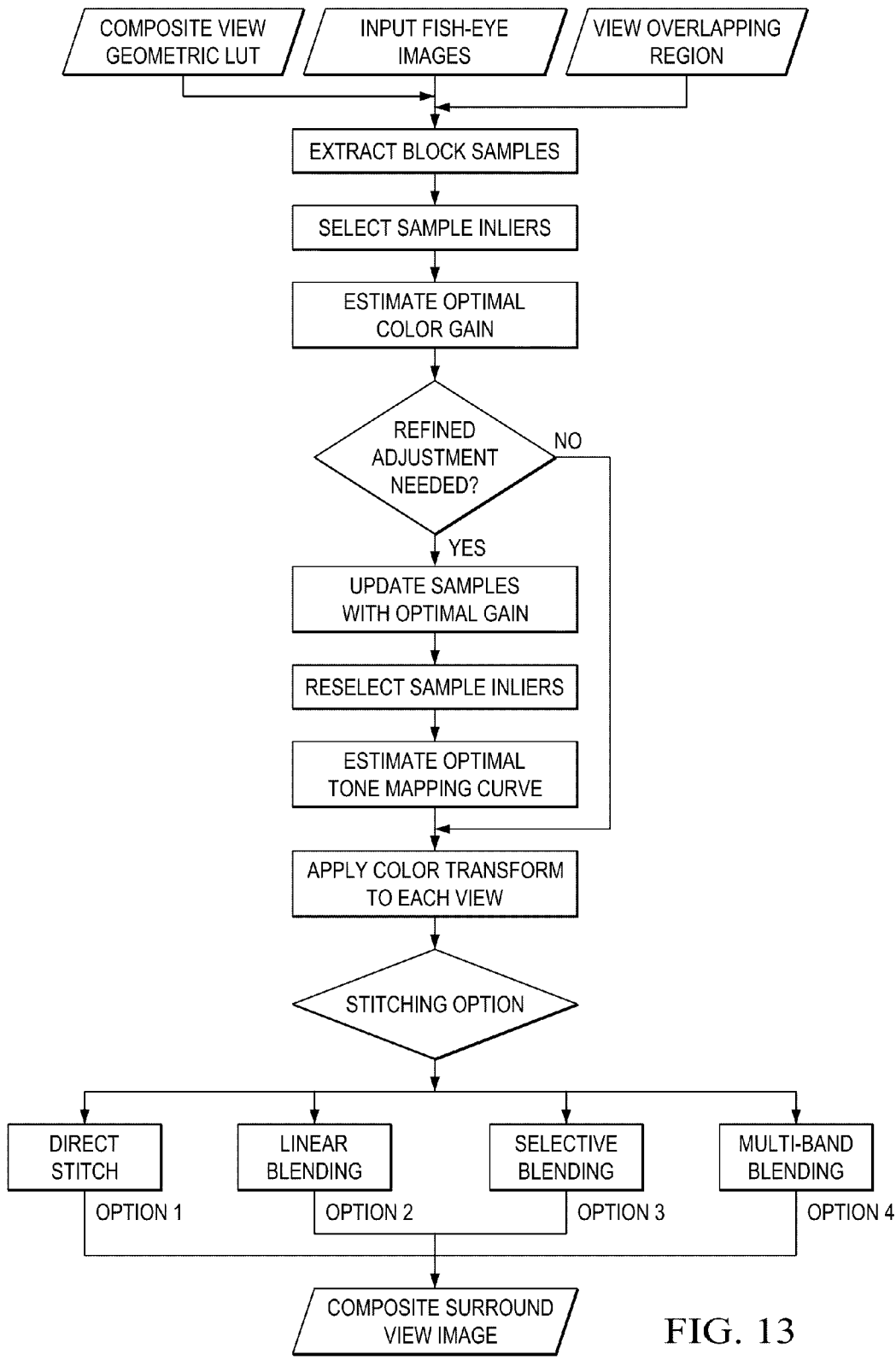
FIG. 13 is an embodiment of a flow diagram of photometric alignment analysis.
Figure 14:
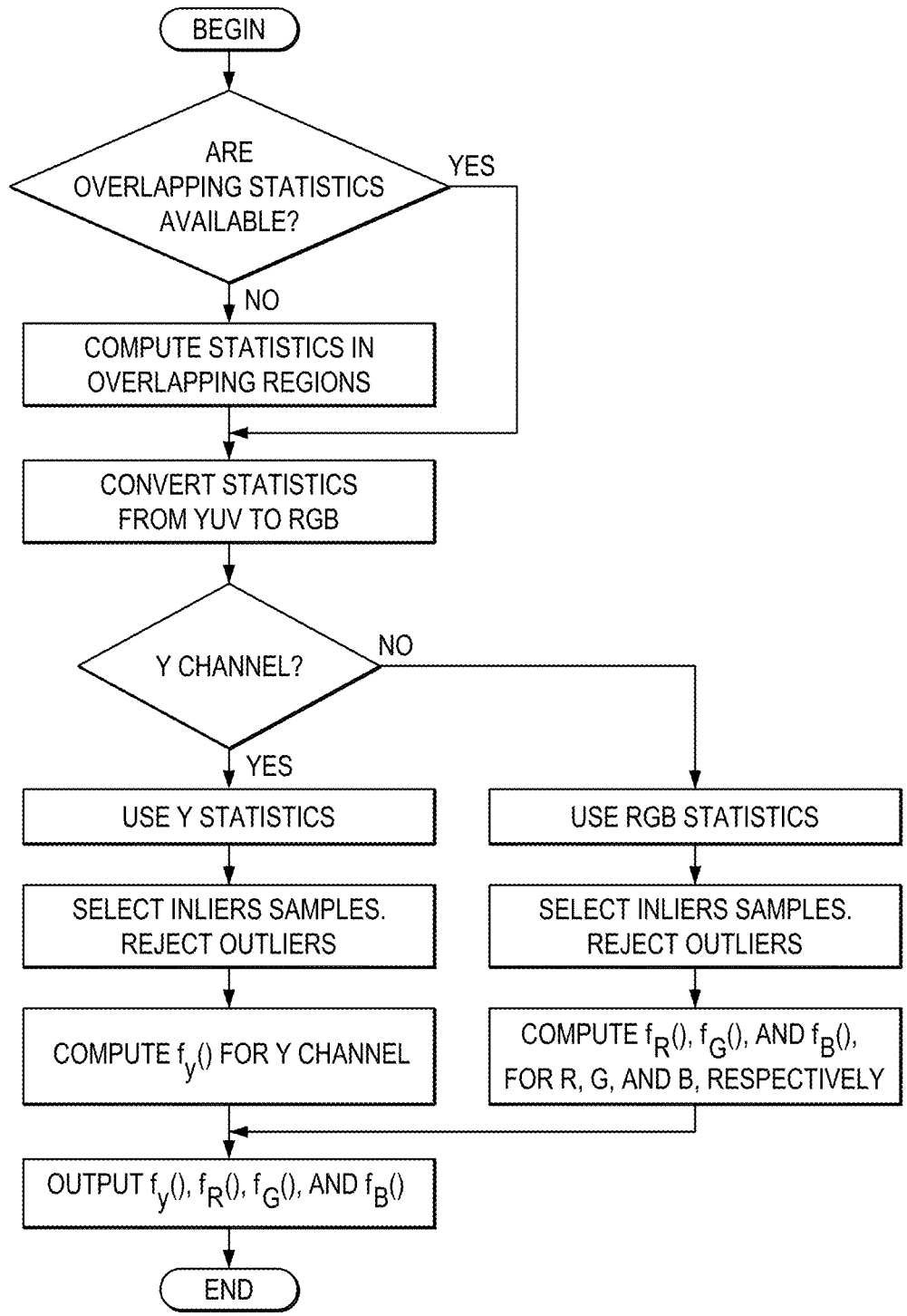
FIG. 14 is an embodiment of a flow diagram of photometric correction process.

The photometric correction corrects the brightness and color mismatch among the four views so that there is no visible seams in the composite surround view. This is achieved by applying tone mapping to each view before stitching. The photometric correction model takes the general form of eqn. (12).

$$I_{out} = f_I^i(I_{in}), i=1,2,\ldots,N, \quad (12)$$

where, $f_I^i(\bullet)$ is a tone mapping function that maps the input value to an output value, and N is the number of views (i.e., cameras), and I is R or G or B for RGB input format, or Y or U or V for YUV input format The problem of photometric alignment is that it estimates the optimal $f_I^i(\bullet)$ for each view and each color channel. Photometric alignment consists of two stages. The first stage is photometric alignment analysis where $\{f_I^i(\bullet), i=1, 2, \ldots, N\}$ are estimated based on analyzing image data. The flow diagram for photometric alignment analysis is shown in FIG. 13. After the tone mapping functions are estimated, the second stage of photometric alignment is to apply the tone correction. This is done during composite view synthesis stage. The flow diagram for photometric alignment correction is shown in FIG. 14.

Figure 15:
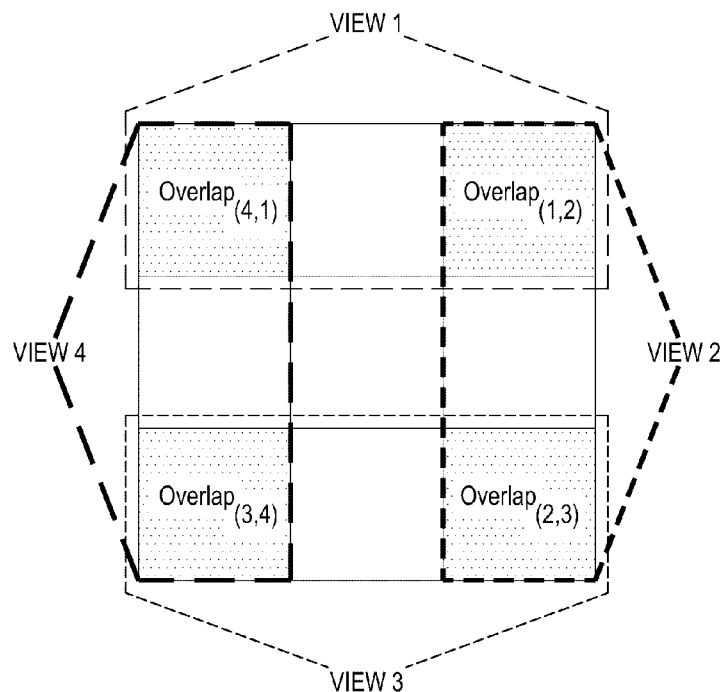
FIG. 15 is an embodiment of an overlapping regions between adjacent views in the composite surround view output for a four-camera-surround-view-system.

In the analysis stage, the optimal photometric correction tone mapping functions for each view and each color channel, assuming that proper geometric alignment of the views are already performed, where fisheye distortion for all input views are corrected and they are all registered with the ground plane. A step by step description is as follows:

In the first step, photometric statistics for overlapping regions are computed. As shown in FIG. 15, the composite surround view consists of data from all four input frames, view 1, 2, 3, and 4. The overlapping regions are the portion of the frames that corresponds to the same physical world and captured by two adjacent cameras, e.g., $Overlap_{(1,2)}$ refers to the overlapping region between view 1 and view 2, and so on. Each overlap region $Overlap_{(i,j)}$ contains one pair of sub-images, one is from view i and the other is from view j. The Photometric alignment function uses pairs of image data in $Overlap_{(1,2)}$, $Overlap_{(2,3)}$, $Overlap_{(3,4)}$, and $Overlap_{(4,1)}$ to estimate a tone mapping curve for each camera and each color channel. Photometric statistics, i.e, the block averages, are collected from $Overlap_{(1,2)}$, $Overlap_{(2,3)}$, $Overlap_{(3,4)}$ and $Overlap_{(4,1)}$ for subsequent analysis. If photometric statistics are already collected during other stages of the surround view, such as synthesis or geometric alignment, this step may be skipped.

In the next step, data that belong to objects above the ground that are wrongly matched by geometric alignment are rejected. After getting rid of these data, inlier samples are left for each overlapping region.

Figure 16:
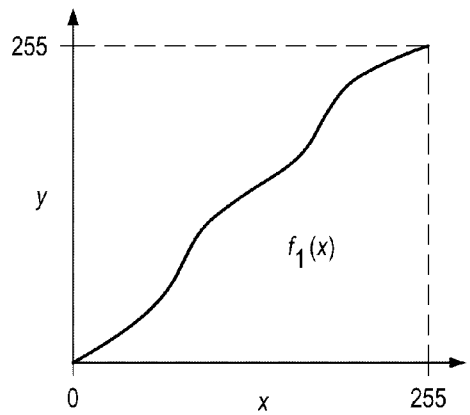
FIG. 16 is an embodiment of a tone mapping curve f(x)

Third, the optimal tone mapping functions $\{f_1^{(k)}(x), f_2^{(k)}(x), f_3^{(k)}(x), f_4^{(k)}(x)\}$ is estimated. The tone mapping curves, as shown in FIG. 16, are functions that map an input value to an output value. For RGB input data format, $\{f_1^{(k)}(x), f_2^{(k)}(x), f_3^{(k)}(x), f_4^{(k)}(x)\}$ are jointly optimized for all four views (i.e., cameras), but independently optimized for each color channel, k=1, 2, 3. The simplest tone mapping curve is in the form of a linear gain, i.e., x_out=g*x_in, where the tone mapping function f( ) is reduced to a scalar g.

If the input data format is RGB, then the gains for each color channel (R, G, B) and each view may be estimated. If the input data format is YUV, which is the most common video format, then for the Y channel, a gain for Y is estimated for estimating RGB gains. For U and V channel, we do the following: (1) Convert the sample statistics from YUV to RGB, (2) Estimate RGB gains and (3) output $[g_R^n, g_G^n, g_B^n, g_Y^n]$ n=1, 2, 3, 4 index the views.

Figure 17:
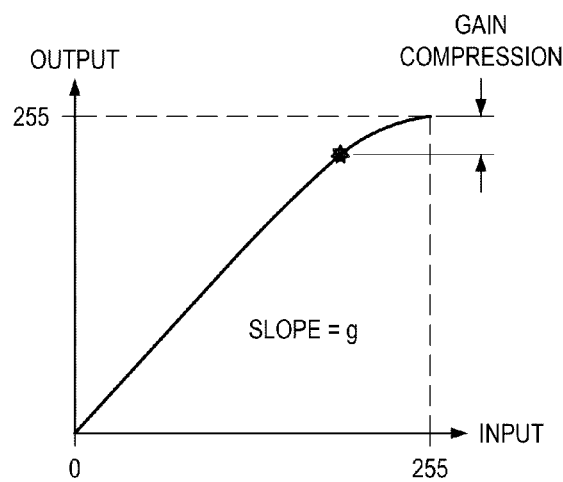
FIG. 17 is an embodiment of a tone curve from gain g by maintaining the linear gain g until K.
Figure 18:
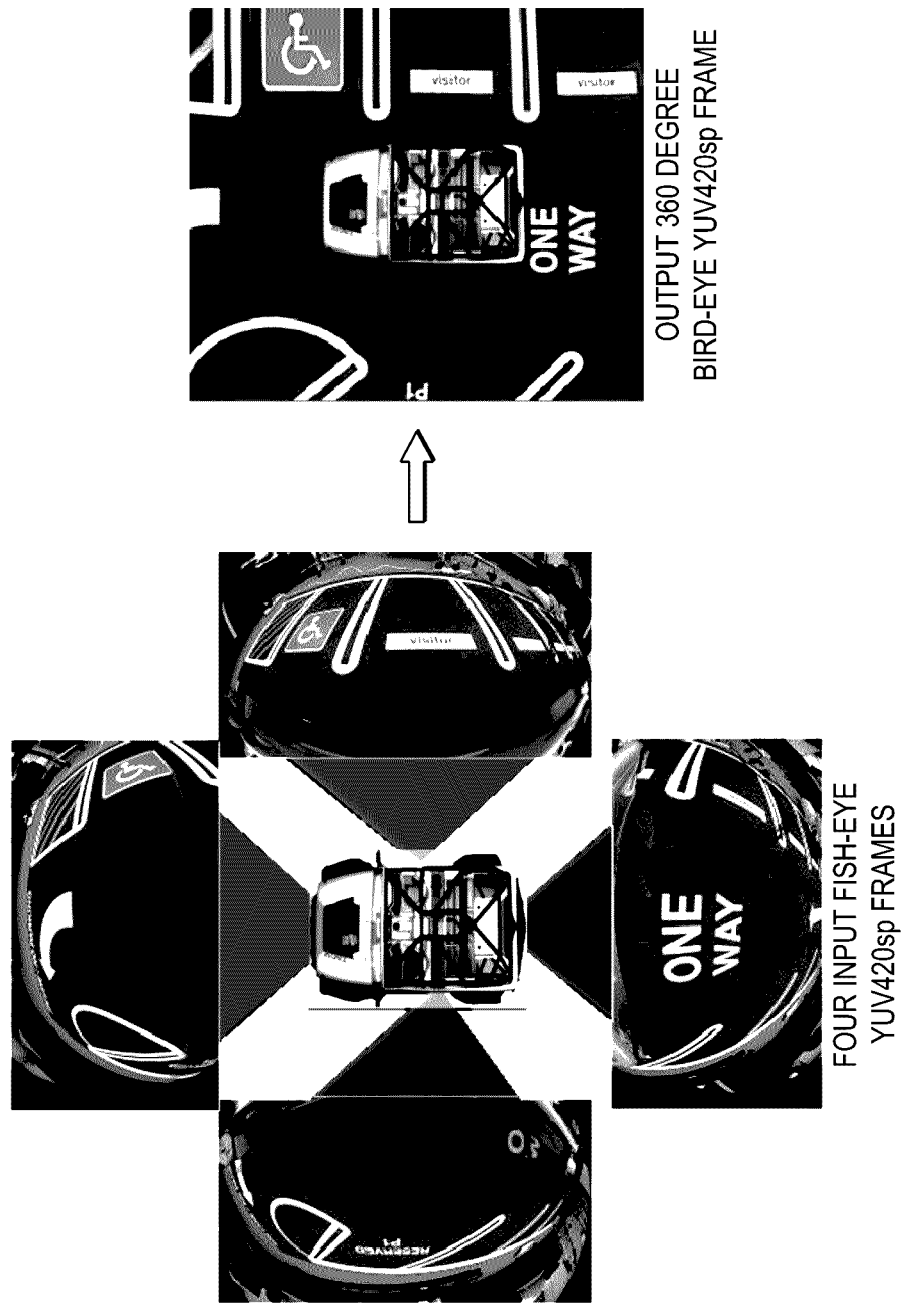
FIG. 18 is an embodiment of a surround view camera output with proper geometric alignment and the photometric alignment.

Optionally, the next step may estimate a tone mapping function from each gain as the final output $$[f_R(\bullet), f_G(\bullet), f_B(\bullet), f_Y(\bullet)]_i \; i=1,2,3,4$$

index the views. The tone mapping function can be obtained through gain by maintaining a linear gain for input data ranging [0 K]. Assuming the input data is 8 bit, then from [K 255], we compress the gain in a non-linear monotonous fashion such that no input value is mapped outside the range of [0 255] while the monotonicity of the data is also maintained. The gain compression tone mapping curve is shown in FIG. 17.

In the correction stage, we apply the gains or tone mapping curves estimated from II-1 to the view before synthesizing the composite view. The correction step normally happens during view synthesis stage. To generate a output pixel at the i-th row and j-th column of the composite view, i.e., $H_{out}[i, j]$.

In some embodiments, the input and output data format are RGB and the photometric correction is applied.

$$H_{out}[i, j, k] = \sum_{n=1}^{N} w_n^k f_k^n(H_n[\hat{i}, \hat{j}, k]), \quad (13)$$

$$[i, j] \in [M_1^{out}, M_2^{out}], [\hat{i}, \hat{j}] \in [M_1^{in}, M_2^{in}], k = 1, 2, 3$$

where $H_n[\hat{i}, \hat{j}, k]$ is the input image for view n at the $\hat{i}$-th row, $\hat{j}$-th column, k-th color channel, $\hat{i}$ and $\hat{j}$ are obtained through looking up the input pixel location for $H_{out}[i, j, k]$ through geometric alignment function. $f_k^n()$ is the tone mapping function for view n and color channel k, $w_n^k$ is the blending weight for view n and color channel k, N is the number of views, $M_1^{in}$ and $M_2^{in}$ are the row and column sizes of the input views, respectively. $M_1^{out}$ and $M_2^{out}$ are the row and column sizes of the output composite view, respectively, k indexes the color channels If the input and output data format is YUV format, then the most common YUV formats are YUV422 and YUV420. In both cases, the data is arranged in one dimension, with Y plane in raster order followed by interleaved UV planes, or Y plane interleaved with both U and V plane. In this case, photometric correction for Y and UV are applied separately.

For Y, we apply the tone mapping function for Y channel estimated in Sec II-1, as follows $$Y_{out}[i] = \sum_{n=1}^{N} w_n^k f_Y^n(Y_n[\hat{i}]), \; i \leq L_Y^{out}, \hat{i} \leq L_Y^{in} \quad (14)$$

Where $f_Y^n()$ is the tone mapping function for the Y channel of view n, and $Y_n[\hat{i}]$ is the Y value at $\hat{i}$-th entry of input view n. For U and V, we apply tone mapping correction as follows:

Step 1: convert UV to RGB. If Y is still available at this point, we apply standard RGB to YUV conversion. If Y is no longer available (for YUV420sp data format, once we move to the UV portion of the image, Y is normally not available any more), we simply use 128 (for 8 bit data precision) to substitute Y, and convert (128, $U_{in}$, $V_{in}$) to ($R_{in}$, $G_{in}$, $B_{in}$) through standard RGB to YUV conversion.

Step 2: Apply tone correction using the tone mapping functions $$[f_R(\bullet), f_G(\bullet), f_B(\bullet)]_i$$

obtained in Sec II-1 to the RGB data according to eqn (2) and, to get ($R_{out}$, $G_{out}$, $B_{out}$).

Step 3: Convert ($R_{out}$, $G_{out}$, $B_{out}$) to ($y_{out}$, $U_{out}$, $V_{out}$) using standard RGB to YUV conversion. Output $U_{out}$ and $V_{out}$. The $y_{out}$ from step 2 is dumpy value that is not used. In the case the tone mapping function is reduced to gains, we can combine the above steps to get the $U_{out}$ and $V_{out}$ as follows $$\begin{bmatrix} y_{out} \\ U_{out}^n[i] \\ V_{out}^n[i] \end{bmatrix} = A \cdot \begin{bmatrix} g_R^n & 0 & 0 \\ 0 & g_G^n & 0 \\ 0 & 0 & g_B^n \end{bmatrix} \cdot B \cdot \begin{bmatrix} 128 \\ U_{in}^n[\hat{i}] \\ V_{in}^n[\hat{i}] \end{bmatrix}, \quad (15)$$

where B is the 3×3 YUV to RGB conversion matrix, A is the 3×3 YUV to RGB conversion matrix, $$A \cdot B = \begin{bmatrix} 1 & 0 & 0 \\ 0 & 1 & 0 \\ 0 & 0 & 1 \end{bmatrix} \cdot \{g_R^n, g_G^n, g_B^n\}$$

are the gains for the R, G, and B channels of view n, respectively. Thus, with ($Y_{out}$, $U_{out}$, $V_{out}$), the photometric alignment is complete While the foregoing is directed to embodiments of the present invention, other and further embodiments of the invention may be devised without departing from the basic scope thereof, and the scope thereof is determined by the claims that follow.

What is claimed is:

1. A method for use in a surround view camera system, the method comprising:
performing block averaging on samples in respective blocks of pixel values in a view overlapping region of a plurality of views to extract block samples from the view overlapping region of the plurality of views;
determining block sample pairs based on the block samples where each of the block samples in a block sample pair corresponds to a same position in the view overlapping region and to a respective one of the plurality of views;
selecting one or more of the block sample pairs as first sample inliers based on a sum of squared distances between corresponding components in respective block samples of each of the block sample pairs;
estimating a color gain for the selected block sample pairs;
updating block samples of the selected block sample pairs based on the estimated color gain to generate gain-adjusted block sample pairs;
selecting one or more of the gain-adjusted block sample pairs as second sample inliers based on a sum of squared distances between corresponding components in respective block samples of each of the gain-adjusted block sample pairs;
estimating a tone mapping curve based on the selected gain-adjusted block sample pairs;

applying a color transform to each of the plurality of views based on the estimated tone mapping curve to produce a plurality of color transformed views; and producing a composite surround view image based on the color transformed views.

2. The method of claim 1 further comprising stitching the color transformed views by at least one of direct stitching, linear blending, selective blending and multi-band blending.

3. A non-transitory computer readable medium comprising instructions that, when executed by a processor, cause the processor to:

perform block averaging on samples in respective blocks of pixel values in a view overlapping region of a plurality of views to extract block samples from the view overlapping region of the plurality of views;

determine block sample pairs based on the block samples where each of the block samples in a block sample pair corresponds to a same position in the view overlapping region and to a respective one of the plurality of views;

select one or more of the block sample pairs as first sample inliers based on a sum of squared distances between corresponding components in respective block samples of each of the block sample pairs;

estimate a color gain for the selected block sample pairs;

update block samples of the selected block sample pairs based on the estimated color gain to generate gain-adjusted block sample pairs;

select one or more of the gain-adjusted block sample pairs as second sample inliers based on a sum of squared distances between corresponding components in respective block samples of each of the gain-adjusted block sample pairs;

estimate a tone mapping curve based on the selected gain-adjusted block sample pairs;

apply a color transform to each of the plurality of views based on the estimated tone mapping curve to produce a plurality of color transformed views; and produce a composite surround view image based on the color transformed views.

4. The non-transitory computer readable medium of claim 3, wherein the instructions further cause the processor to stitch the color transformed views by at least one of direct stitching, linear blending, selective blending and multi-band blending.

5. A surround view camera system, comprising:

a memory; and a processor configured to perform a method for producing a composite surround view image, the method comprising:

performing block averaging on samples in respective blocks of pixel values in a view overlapping region of a plurality of views to extract block samples from the view overlapping region of the plurality of views;

determining block sample pairs based on the block samples where each of the block samples in a block sample pair corresponds to a same position in the view overlapping region and to a respective one of the plurality of views;

selecting one or more of the block sample pairs as first sample inliers based on a sum of squared distances between corresponding components in respective block samples of each of the block sample pairs;

estimating a color gain for the selected block sample pairs;

updating block samples of the selected block sample pairs based on the estimated color gain to generate gain-adjusted block sample pairs;

selecting one or more of the gain-adjusted block sample pairs as second sample inliers based on a sum of squared distances between corresponding components in respective block samples of each of the gain-adjusted block sample pairs;

estimating a tone mapping curve based on the selected gain-adjusted block sample pairs;

applying a color transform to each of the plurality of views based on the estimated tone mapping curve to produce a plurality of color transformed views; and producing the composite surround view image based on the color transformed views.

6. The system of claim 5 further comprising stitching the color transformed views by at least one of direct stitching, linear blending, selective blending and multi-band blending.

* * * * *